| United States Patent [19] | [11] Patent Number: 4,464,670 |
|---|---|
| Leonard et al. | [45] Date of Patent: Aug. 7, 1984 |

[54] OPTICAL DISK MOUNTING MEANS FOR WRITE/READ APPARATUS

[75] Inventors: Eric M. Leonard; William W. Knight, both of Rochester, N.Y.

[73] Assignee: Eastman Kodak Company, Rochester, N.Y.

[21] Appl. No.: 451,127

[22] Filed: Dec. 20, 1982

[51] Int. Cl.³ .............................................. G01D 15/24
[52] U.S. Cl. .................................... 346/137; 369/270; 369/271
[58] Field of Search ................ 346/137; 369/270, 271; 360/102, 97, 135; 220/260, 281; 339/45 R, 45 M, 117 P; 403/14, 15; 285/29, 97, 308; 84/24

[56] References Cited

U.S. PATENT DOCUMENTS 4,365,257 12/1982 Gerfast .................................. 346/137
4,365,258 12/1982 Geyer .................................... 346/137

*Primary Examiner*—E. A. Goldberg
*Assistant Examiner*—Mark Reinhart
*Attorney, Agent, or Firm*—Milton S. Sales

[57] ABSTRACT

This disclosure relates to means for receiving disk assemblies in a manner to impart constant tension to the support and cover sheet, while assuring easy and quick loading and unloading of the disk assemblies.

An optical disk assembly includes a web assembly including a flexible disk-shaped support and an opposed cover sheet. An annular retaining ring engages the web assembly around its periphery. The support carries a record layer with an information storage region. Cooperating optical disk write/read apparatus has an annular, rotatable locating surface against which the web assembly abuts. Detent means releasably secure the disk assembly retaining ring in an active position, with firm contact between the web assembly and the rotatable locating surface. The detent means is releasable when subjected to a predetermined force from the retaining ring, whereby the retaining ring is movable into and out of its active position by mere application of sufficient force thereto. The write/read apparatus includes a selectively inflatable tube positioned to bear against the ring when inflated for applying a force to move the ring from its active position.

15 Claims, 6 Drawing Figures

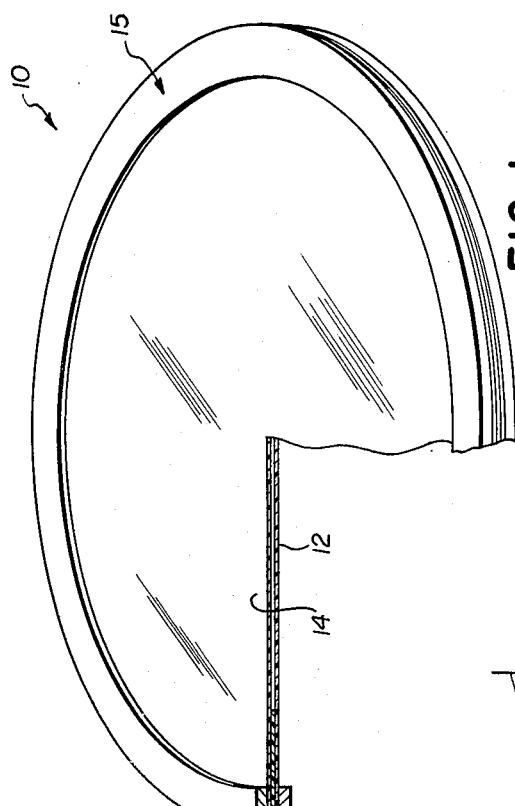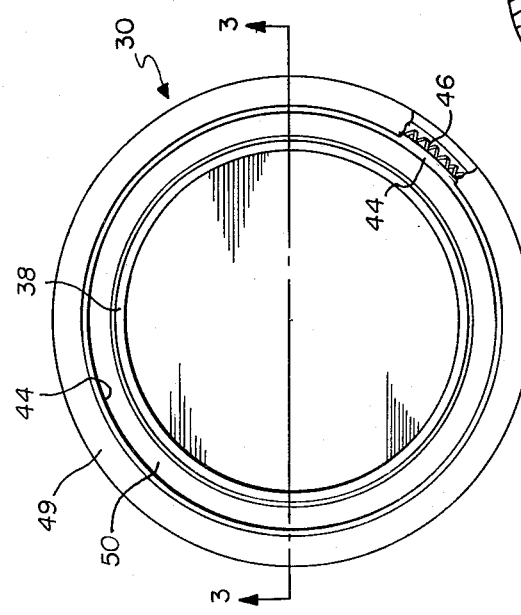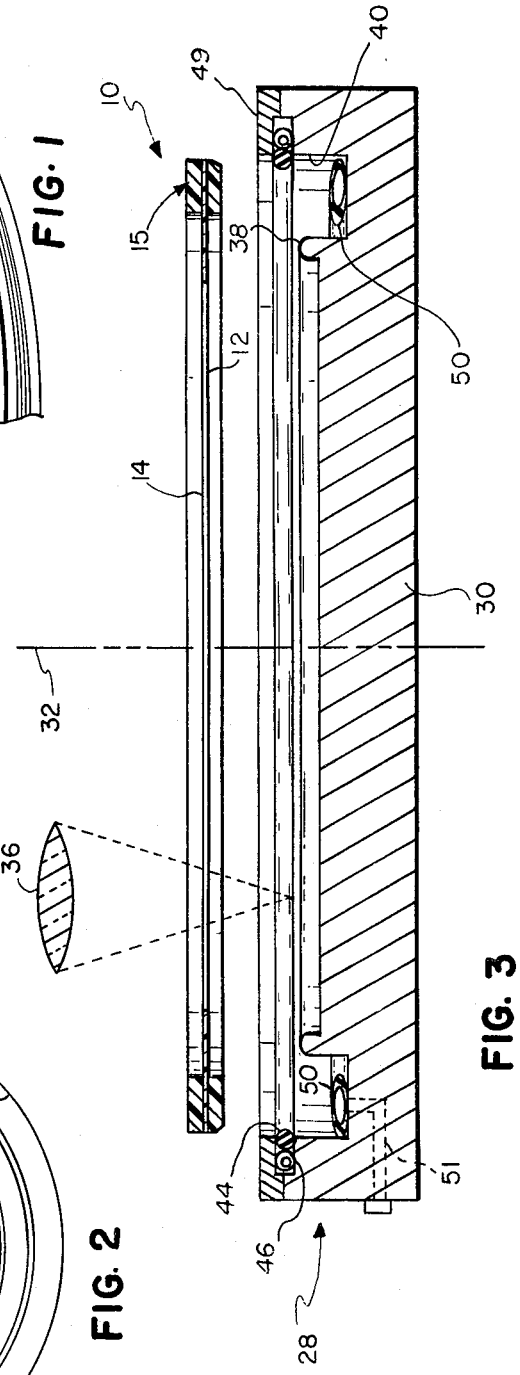

OPTICAL DISK MOUNTING MEANS FOR WRITE/READ APPARATUS

CROSS-REFERENCE TO RELATED APPLICATION

Reference is made herein to commonly-assigned, copending U.S. patent application Ser. No. 264,313, filed May 18, 1981 in the names of F. F. Geyer and E. M. Leonard.

BACKGROUND OF THE INVENTION

1. Field of the Invention

The present invention relates to record medium and apparatus useful in high density storage of information by optical writing and/or reading, and more particularly to improved configurations for optical disk write/read apparatus.

2. Description of the Prior Art

The currently preferred optical disk technology employs disk elements with spiral or concentric tracks of minute (e.g., on the order of a micron or less in size), optically-detectable marks. One real-time mode of recording (writing) such marks is by scanning tracks on the disk with an equivalently small beam of radiation (e.g., from a laser) which is modulated "off or on" according to an electrical signal representative of the information to be written. Information is recovered (read) by scanning the tracks with the same size or only slightly larger, but still very tightly focused, radiation (e.g. light) spot. The recovered information is in the form of a fluctuating electrical signal obtained from a photodetector that senses the read-out light reflected from the recorded disk.

In order to write and read information in the form of such minute markings, optical systems of high numerical aperture are used to focus light to equivalently minute spots. Such optical systems have extremely small depths of focus and the proper positional relation between the writing or reading optical system, and the optical disk record surface must be stringently maintained both smooth and flat.

One approach to achieve requisite smoothness and flatness has been to form the disk substrate of glass with a ground and polished surface. This requires a time-consuming and costly fabrication procedure. Another approach is to mold a plastic disk substrate with a highly finished surface and apply a surface smoothing sublayer. However, it is extremely difficult to mold such plastic disks having adequate surface characteristics with a good yield; and this support fabrication method is also relatively costly.

Still another approach for meeting smoothness, flatness and protective requirements is disclosed in commonly-assigned, copending U.S. patent application Ser. No. 264,313 filed May 18, 1981 in the names of F. F. Geyer and E. M. Leonard. In that approach an improved optical disk assembly adapted for high density storage of information comprises (i) a flexible, disk-shaped support carrying a record layer; (ii) a transparent disk cover sheet opposing the record layer, and (iii) an annular retaining ring for holding the support and cover sheet in a relatively low circumferentially-symmetric tension and tensioned to an operating tension when drawn over a rotatable annular locating surface on the disk assembly receiving structure of the optical disk write/read apparatus. Thus the disk assembly can normally be kept with the support material in low "storage" tension, and used with the support material in higher "operating" tension to enhance flatness.

SUMMARY OF THE INVENTION

The present invention is an improvement over prior art means for receiving disk assemblies in a manner to impart constant tension to the support and cover sheet, while assuring easy and quick loading and unloading of the disk assemblies.

An optical disk assembly for use with the optical disk apparatus of the invention includes a web assembly including a flexible disk-shaped support and preferably an opposed cover sheet. An annular retaining ring engages the web assembly around its periphery. The support carries a record layer with an information storage region. Cooperating optical disk write/read apparatus in accordance with the present invention has an annular, rotatable locating surface engageable by the web assembly. Detent means secure the disk assembly retaining ring in an active position, with firm contact between the web assembly and the rotatable locating surface. The detent means is releasable when subjected to a predetermined force from the retaining ring, whereby the retaining ring is movable out of its active position by mere application of sufficient force thereto. Preferably, the detent means operates to permit movement of the retaining ring into as well as out of its active position by force applied to the ring.

The write/read apparatus preferably includes means for applying a force to the retaining ring for overcoming the detent means to move the ring from its active position. The force apply means may take the form of a selectively inflatable tube positioned to bear against the ring when inflated.

The invention and its objects and advantages, will become more apparent in the detailed description of the preferred embodiment presented below.

BRIEF DESCRIPTION OF THE DRAWINGS

The description of preferred embodiment refers to the attached drawings wherein:

FIG. 1 is a fragmented perspective, schematic view of an optical disk assembly particularly suited for use with an optical disk write/read apparatus according to the present invention;

FIG. 2 is a top plan view of a portion of an optical disk write/read apparatus according to the present invention;

FIG. 3 is a sectional view of the optical disk write/read apparatus taken along line 3—3 of FIG. 2, together with a sectional view of the optical disk assembly of FIG. 1.

DESCRIPTION OF THE PREFERRED EMBODIMENT

Figure 4:
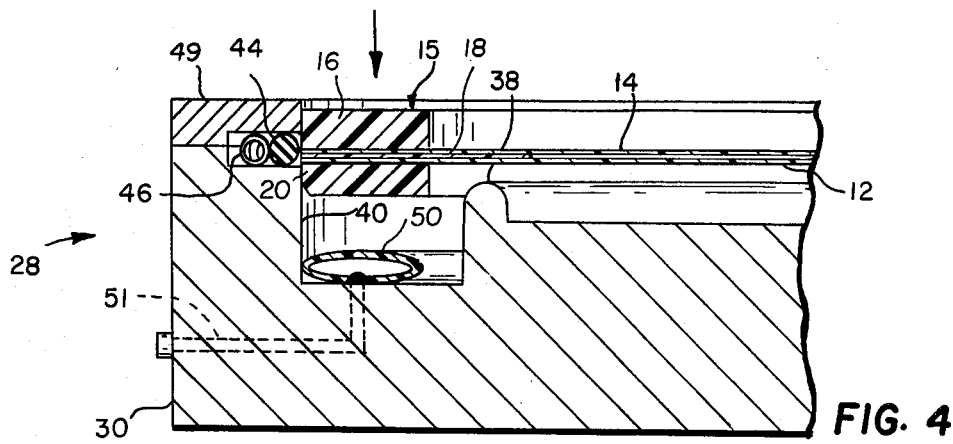
FIGS. 4–6 are partial views of the apparatus and assembly of FIG. 3, showing sequential operation thereof.

Referring to schematic FIG. 1, an optical disk assembly 10 includes a flexible, disk-shaped support 12 having a record layer (and other appropriate layers) on one major surface of the support. The disk assembly also includes a continuous, flexible, disk-shaped cover sheet 14 which is substantially transparent with respect to the write and/or read wavelength suitable for use with the record layer. The diameter of cover sheet 14 corresponds generally to the diameter of support 12.

The support and cover sheet are held in spaced relation by an annular retaining ring 15 which engages support 12 and cover sheet 14 substantially continuously around respective annular peripheral portions thereof. The record layer has a predetermined annular information storage region radially inwardly of the retaining ring. Reference is made to aforementioned U.S. patent application Ser. No. 264,313 for a description of useful and preferred materials and characteristics for the support and the cover sheet.

Cover sheet 14 and disk-shaped support 12 are retained in circumferentially-symmetric tension by cooperating annular ring members 16, 18 and 20 of retaining ring 15. It is preferred that the cooperative engagement between disk-shaped support 12, cover sheet 14, and retaining ring 15 significantly seal the space between the record layer on support 12 and the opposed surface of cover sheet 14. Although not included in the illustrated embodiment, the optical disk assembly may have a central rigid hub including spacing means for maintaining proper spacing between the record layer and the cover sheet.

Preferred tensions for the disk-shaped support and cover sheet materials are from substantially zero to just below the elastic limit, or yield point, of those materials. More specifically, the preferred tension depends upon the desired degree of planarity for the particular member (i.e. size, composition, etc.) used. It is preferred that "storage" and "operating" support material tensions be below the elastic limit of the particular material; however, in certain applications some yield can be acceptable as long as surface planarity remains in the desired tolerance. In general, the tension (particularly storage tension) should be selected with respect to the support material so that the stressed material's continuous relaxation over time (i.e. material creep) is slow enough to insure adequate spacing and planarizing tension throughout the expected product life period.

Several examples of suitable retaining rings are disclosed in the aforementioned copending U.S. patent application. Generally, the retaining ring has means for engaging support 12 and cover sheet 14, and for holding them in spaced relation under circumferentially-symmetric tension.

FIGS. 2 and 3 show a preferred embodiment of disk assembly receiving structure 30 of cooperating optical disk write/read apparatus useful in combination with the above-described optical disk assembly. The optical disk write/read apparatus is similar to the various other optical disk write/read apparatus known in the art, and only the disk assembly receiving structure 28 which cooperates more directly with the disk assembly will be described in detail.

Disk assembly receiving structure 28 comprises a turntable 30 adapted for rotation about axis 32 by drive means (not shown). The optical disk write/read apparatus also includes an optics system, represented by lens 36, which is adapted to focus write/read light in a focal plane that is normal to axis 32.

An annular locating surface 38 on turntable 30 rotates in a plane substantially normal to axis 32. Locating surface 38 is positioned to be engaged by support 12 in an annular area radially outward of the annular information storage region of the record layer. The locating surface has predetermined dimensions with respect to the focal plane of the optics system of the disk write/read apparatus and the thickness of support 12 so that the recording layer of a disk assembly located on the turntable will closely proximate a nominal focal plane position of lens 36.

Figure 5:
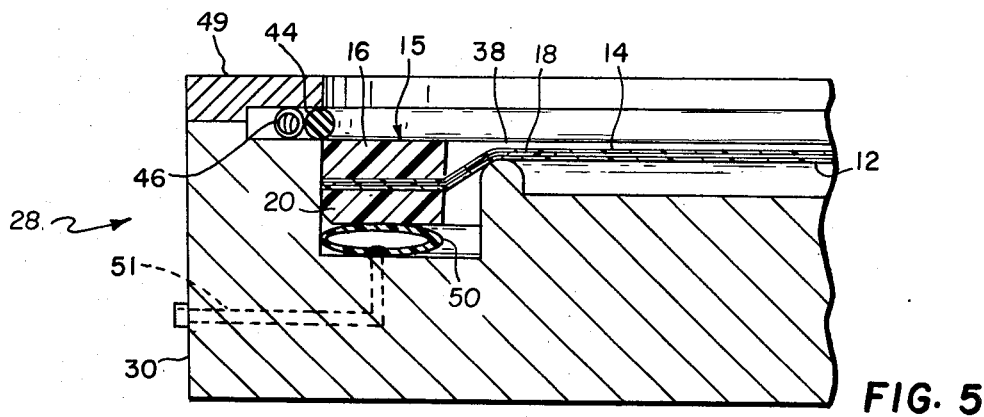
Figure 6:
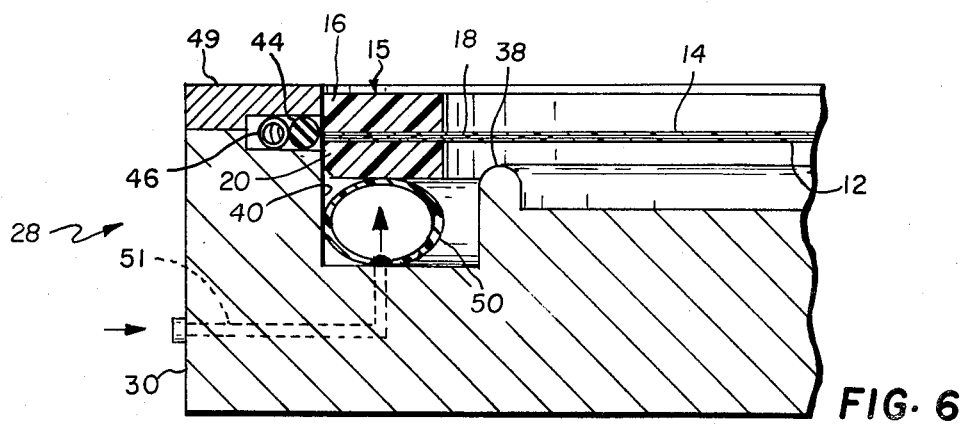

Turntable 30 has means for receiving and holding retaining ring 15 of disk assembly 10, and in the illustrated embodiment, such means includes an annular cavity 40 radially outward of locating surface 38. The outer surface of cavity 40 (i.e., that surface which faces radially inwardly) is a close, sliding fit with an outer surface of retaining ring 15. This is best seen in FIGS. 4-6.

As retaining ring 15 moved downwardly into cavity 40, by a force (denoted by arrow 42 in FIG. 4), the bottom of support 12 contacts annular locating surface 38. Continued downward movement of ring 15 tensions support 12 and cover sheet 14 over the locating surface with circumferentially-symmetric tension forces in the support and cover sheet when the ring is in its active position as shown in FIG. 5.

Detent means are provided for releasably securing ring 15 in its active position at the proper height relative to locating surface 38. By providing generally uniform loading around ring 15, rather than point loading, the support and cover sheet are placed in substantially uniform tensions.

The detent means operates as a releasable holddown rather than as a positive lock. Thus, ring 15 can be pushed into and out of its active position in cavity 40 merely by applying sufficient force to release the detent means. In the illustrated embodiment, the detent means includes a continuous compliant O-ring 44 (or rigid segmented pieces, not shown, which form a continuous ring). Spring means, such as endless coil spring 46, supplies an even, radially inward pressure to the O-ring. The detent means is captured in an annular recess 48 by a ring cap 49.

As ring 15 is pushed into cavity 40, O-ring 44 is forced against spring 46 to allow the retaining ring full access to the cavity (FIG. 4). After the retaining ring is in position, the O-ring snaps back into its holddown position (FIG. 5) inhibiting passage of the retaining ring.

Cavity 40 contains means for extracting retaining ring 15 by selectively applying a force to the ring sufficient to release the detent means. In the illustrated embodiment, the extracting means includes an inflatable tube 50 at the bottom of cavity 40. The tube can be selectively inflated by applying fluid pressure through a passage 52 in turntable 31.

The invention has been described in detail with particular reference to certain preferred embodiments thereof, but it will be understood that variations and modifications can be effected within the spirit and scope of the invention.

What is claimed is:

1. Disk write and/or read apparatus adapted for receiving a disk assembly which includes (1) a flexible, disk-shaped support carrying a record layer and (2) an annular retaining ring engaging the support around its peripheral region and positionable in a predetermined active position; said apparatus comprising:

(a) an annular locating surface rotatable about a predetermined axis, said locating surface engaging the support of a received disk assembly with a predetermined abutting force to provide firm contact between the disk-shaped support and said locating surface when the retaining ring is in the active position; and (b) detent means for releasably securing the retaining ring in the active position, said detent means being releasable when subjected to a predetermined force from the retaining ring, whereby the retaining ring is movable out of the active position by mere application of sufficient force thereto.

2. Disk write and/or read apparatus as claimed in claim 1 further comprising means for selectively applying a force to that retaining ring when in the active position for releasing said detent means to remove the retaining ring from its active position.

3. Disk write/and or read apparatus as claimed in claim 2 wherein said force applying means is adapted to apply a resilient force to the retaining ring.

4. Disk write and/or read apparatus as claimed in claim 2 wherein said force applying means includes a selectively inflatable tube adapted to apply a resilient force to the retaining ring when inflated.

5. Disk write and/or read apparatus as claimed in claim 1 wherein said detent means comprises: (a) a continuous ring expandable radially from a position inhibiting passage of the retaining ring to a position permitting such passage; and
  (b) spring means for urging said expandable ring toward its passage inhibiting position.

6. Optical disk write and/or read apparatus adapted for receiving an optical disk assembly which includes (1) a flexible, disk-shaped support carrying a record layer and (2) an annular retaining ring engaging the support around its peripheral region and positionable in a predetermined active position; said apparatus comprising:
  (a) lens means for focusing light at a focal plane normal to a predetermined axis;
  (b) an annular locating surface rotatable in a plane normal to said axis, said locating surface engaging the support of a received optical disk assembly with a predetermined abutting force to provide firm contact between the disk-shaped support and said locating surface when the retaining ring is in the active position; and
  (c) detent means for releasably securing the retaining ring in the active position, said detent means being releasable when subjected to a predetermined force from the retaining ring, whereby the retaining ring is movable out of the active position by mere application of sufficient force thereto.

7. Optical disk write and/or read apparatus as claimed in claim 6 further comprising means for selectively applying a force to the retaining ring when in the active position for releasing said detent means to remove the retaining ring from its active position.

8. Optical disk write and/or read apparatus as claimed in claim 7 wherein said force applying means is adapted to apply a resilient force to the retaining ring.

9. Optical disk write and/or read apparatus as claimed in claim 7 wherein said force applying means includes a selectively inflatable tube for applying a resilient force to the retaining ring when inflated.

10. Optical disk write and/or read apparatus as claimed in claim 6 wherein said detent means comprises:
  (a) a continuous ring expandable radially from a position inhibiting passage of the retaining ring to a position permitting such passage; and
  (b) spring means for urging said expandable ring toward its passage inhibiting position.

11. Optical disk write and/or read apparatus adapted for receiving an optical disk assembly which includes (1) a flexible, disk-shaped support carrying a record layer and (2) an annular retaining ring engaging the support around its peripheral region and positionable in a predetermined active position; said apparatus comprising:
  (a) lens means for focusing light at a focal plane normal to a predetermined axis;
  (b) an annular locating surface rotatable in a plane normal to said axis; said locating surface engaging the support of a received optical disk assembly with a predetermined abutting force to provide firm contact between the disk-shaped support and said locating surface when the retaining ring is in the active position; and
  (c) detent means for releasably securing the retaining ring in the active position, said detent means being releasable when subjected to a predetermined force from the retaining ring, whereby the retaining ring is movable into and out of the active position by mere application of sufficient force thereto.

12. Optical disk write and/or read apparatus adapted for receiving an optical disk assembly which includes (1) a flexible, disk-shaped support carrying a record layer and (2) an annular retaining ring engaging the support around its peripheral region for holding the support in a first predetermined circumferentially-symmetric tension suitable for storage of the assembly, the retaining ring being positionable in a predetermined active position; said apparatus comprising:
  (a) lens means for focusing light at a focal plane normal to a predetermined axis;
  (b) an annular locating surface rotatable in a plane normal to said axis, said locating surface engaging the support of a received optical disk assembly with a predetermined abutting force to (1) provide firm contact between the disk-shaped support and said locating surface and (2) effect a circumferentially-symmetric tension in the support when the retaining ring is in the active position; and
  (c) detent means for releasably securing the retaining ring in the active position, said detent means being releasable when subjected to a predetermined force from the retaining ring, whereby the retaining ring is movable out of the active position by mere application of sufficient force thereto.

13. Optical disk write and/or read apparatus as claimed in claim 12 further comprising means for selectively applying a force to the retaining ring when in the active position for releasing said detent means to remove the retaining ring from its active position.

14. Optical disc write and/or read apparatus adapted for use with an optical disk assembly having a flexible, disk-shaped web assembly including (1) a support carrying a record layer (2) a cover sheet generally coextensive with the support, (3) annular spacing means beteen the support and the cover sheet for forming an axial space between the record layer and the cover sheet, (4) an information storage region radially inwardly of the spacing means, and (5) an annular retaining ring engaging the web assembly radially outwardly of the information storage region, the retaining ring being positionable in a predetermined active position; said apparatus comprising:
  (a) lens means for focusing light at a focal plane normal to a predetermined axis;
  (b) an annular locating surface rotatable about said axis in a plane normal to said axis, said locating surface engaging the web assembly of a received optical disk assembly with a predetermined abutting force to provide firm contact between the web assembly and said locating surface when the retaining ring is in the active position; and (c) detent means for releasably securing the retaining ring in the active position, said detent means being releasable when subjected to a predetermined force from the retaining ring, whereby the retaining ring is movable out of the active position by mere application of sufficient force thereto.

15. Optical disk write and/or read apparatus as claimed in claim 14 further comprising means for selectively applying a force to the retaining ring when in the active position for releasing said detent means to remove the retaining ring from its active position.

* * * * *